United States Patent
Kanakarajan et al.

(10) Patent No.: US 10,250,634 B2
(45) Date of Patent: Apr. 2, 2019

(54) APPARATUS, SYSTEM, AND METHOD FOR PROTECTING AGAINST DENIAL OF SERVICE ATTACKS USING ONE-TIME COOKIES

(71) Applicant: Juniper Networks, Inc., Sunnyvale, CA (US)

(72) Inventors: Ravindranath C. Kanakarajan, Bangalore (IN); Venkanna Thadishetty, Bangalore (IN)

(73) Assignee: Juniper Networks, Inc, Sunnyvale, CA (US)

( * ) Notice: Subject to any disclaimer, the term of this patent is extended or adjusted under 35 U.S.C. 154(b) by 169 days.

(21) Appl. No.: 15/349,157

(22) Filed: Nov. 11, 2016

(65) Prior Publication Data

US 2018/0139228 A1 May 17, 2018

(51) Int. Cl.
*G06F 17/30* (2006.01)
*H04L 29/06* (2006.01)
*H04J 3/06* (2006.01)

(52) U.S. Cl.
CPC .......... *H04L 63/1458* (2013.01); *H04L 63/08* (2013.01); *H04L 63/0838* (2013.01); *H04L 63/12* (2013.01); *H04L 63/123* (2013.01); *H04J 3/0667* (2013.01); *H04L 63/0236* (2013.01); *H04L 63/061* (2013.01); *H04L 63/18* (2013.01)

(58) Field of Classification Search
CPC . H04L 63/1458; H04L 63/12; H04L 63/0838; H04L 63/123; H04L 63/08; H04L 63/18; H04L 63/0236; H04L 63/061; H04J 3/0667

USPC .......................................................... 726/6
See application file for complete search history.

(56) References Cited

U.S. PATENT DOCUMENTS

| 7,334,126 | B1 | 2/2008 | Gilmore et al. |
| 2003/0076848 | A1* | 4/2003 | Bremler-Barr .......... H04L 29/06 370/412 |
| 2003/0135624 | A1 | 7/2003 | Fontes et al. |
| 2003/0135625 | A1 | 7/2003 | Fontes et al. |
| 2005/0152277 | A1 | 7/2005 | Wu |

(Continued)

OTHER PUBLICATIONS

IPsec; https://en.wikipedia.org/wiki/IPsec, as accessed Sep. 15, 2016; Wikipedia, Feb. 28, 2004.

(Continued)

*Primary Examiner* — Mohammad W Reza
(74) *Attorney, Agent, or Firm* — FisherBroyles, LLP

(57) ABSTRACT

The disclosed apparatus may include (1) a storage device that stores a set of cookies that facilitate authenticating packets received from a node within a network and (2) a processing unit communicatively coupled to the storage device, wherein the processing unit (A) receives at least one packet from the node, (B) identifies a cookie included in the packet received from the node, (C) searches the set of cookies stored in the storage device for the cookie included in the packet received from the node, (D) identifies, during the search of the set of cookies, the cookie included in the packet and (E) protects against a DoS attack by authenticating the legitimacy of the packet based at least in part on the cookie included in the packet being identified in the set of cookies stored in the storage device. Various other apparatuses, systems, and methods are also disclosed.

20 Claims, 8 Drawing Sheets

(56) References Cited

U.S. PATENT DOCUMENTS

2006/0171323 A1* 8/2006 Qian ................. H04L 45/10
    370/252
2008/0034198 A1   2/2008 He et al.
2018/0109554 A1* 4/2018 Reddy ............... H04L 63/1458

OTHER PUBLICATIONS

AutoKey; https://en.wikipedia.org/wiki/AutoKey, as accessed Sep. 15, 2016; Wikipedia; Dec. 15, 2005.

IEEE 802.1AE; https://en.wikipedia.org/wiki/IEEE_802.1AE, as accessed Sep. 15, 2016; Wikipedia; Dec. 16, 2007.

Haller, Neil M.; "The S/Key TM One-Time Password System"; Proceedings of the Internet Society Symposium on Netowrk Distributed System Security, Feb. 3, 1994.

N. Haller, "The S/Key One-Time Password System", Proceedings of the Internet Society Symposium on Network and Distributed System Security, Feb. 3, 1994, http://citeseerx.ist.psu.edu/viewdoc/download?doi=10.1.1.81.822&repl&type=pdf, pp. 1-8.

* cited by examiner

Apparatus 100

Cookies
104

0x3AF7
0xBC19
0x42ED
0x64A2
0x140A
0x4820
0x47BD
0x592F

*FIG. 3*

APPARATUS, SYSTEM, AND METHOD FOR PROTECTING AGAINST DENIAL OF SERVICE ATTACKS USING ONE-TIME COOKIES

BACKGROUND

Denial of Service (Dos) attacks are often perpetrated by malicious users in an effort to render a computing resource (such as a network node and/or server) unavailable and/or inoperable. One way that a malicious user may implement a DoS attack is by disrupting the time synchronization between trusted peers within a network. For example, a malicious user may masquerade as a trusted peer and issue illegitimate time-synchronization packets to one or more other peers using the trusted peer's Internet Protocol (IP) address and/or Media Access Control (MAC) address. These illegitimate packets may introduce inaccurate values into the time-synchronization calculation, thereby potentially rendering these peers unavailable and/or inoperable with respect to one another.

The instant disclosure, therefore, identifies and addresses a need for additional and improved apparatuses, systems, and methods for protecting against DoS attacks.

SUMMARY

As will be described in greater detail below, the instant disclosure generally relates to apparatuses, systems, and methods for protecting against DoS attacks. In one example, an apparatus for accomplishing such a task may include (1) a storage device that stores a set of cookies that facilitate authenticating packets received from a node within a network and (2) a processing unit communicatively coupled to the storage device, wherein the processing unit (A) receives at least one packet from the node within the network, (B) identifies a cookie included in the packet received from the node, (C) searches the set of cookies stored in the storage device for the cookie included in the packet received from the node, (D) identifies, during the search of the set of cookies, the cookie included in the packet received from the node and (E) protects against a DoS attack by authenticating the legitimacy of the packet based at least in part on the cookie included in the packet being identified in the set of cookies stored in the storage device.

Similarly, a router incorporating the above-described apparatus may include (1) a storage device that stores a set of cookies that facilitate authenticating packets received from a node within a network and (2) a processing unit communicatively coupled to the storage device, wherein the processing unit (A) receives at least one packet from the node within the network, (B) identifies a cookie included in the packet received from the node, (C) searches the set of cookies stored in the storage device for the cookie included in the packet received from the node, (D) identifies, during the search of the set of cookies, the cookie included in the packet received from the node and (E) protects against a DoS attack by authenticating the legitimacy of the packet based at least in part on the cookie included in the packet being identified in the set of cookies stored in the storage device.

A corresponding method may include (1) receiving at least one packet from a node within a network, (2) identifying a cookie included in the packet received from the node, (3) searching a set of cookies that facilitate authenticating packets received from the node for the cookie included in the packet, (4) identifying, during the search of the set of cookies, the cookie included in the packet, and (5) protecting against a DoS attack by authenticating the legitimacy of the packet based at least in part on the cookie included in the packet being identified in the set of cookies.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 3 is an illustration of exemplary cookies that facilitate authenticating packets received from a node within a network.

Figure 1:
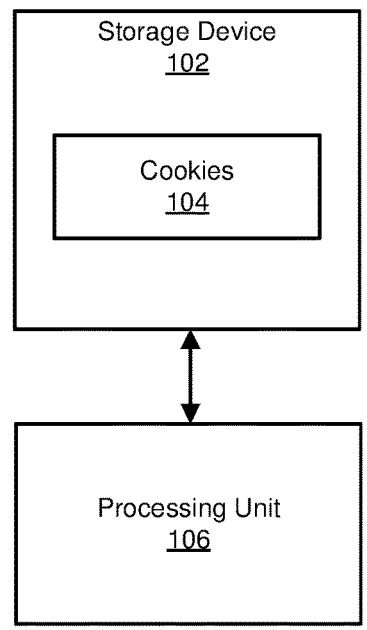
FIG. 1 is a block diagram of an exemplary apparatus for protecting against DoS attacks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for protecting against DoS attacks. As will be explained in greater detail below, embodiments of the instant disclosure may authenticate time-synchronization packets exchanged between nodes within a network based at least in part on a set of cookies. For example, a first node and a second node may attempt to synchronize with one another via a time-synchronization protocol, such as the Network Time Protocol (NTP) and/or the Precision Time Protocol (PTP). As part of this synchronization attempt, the first node may send a set of secret cookies to the second node. This transmission may be sent as an in-band and/or out-of-band communication. Additionally or alternatively, this transmission may be encrypted by the first node using a private key and/or decrypted by the second node using a corresponding public key.

After the set of secret cookies reaches the second node, the second node may receive a time-synchronization packet that appears to have originated from the first node. The second node may authenticate the time-synchronization packet by first identifying a cookie within the time-synchronization packet. The second node may then search the set of secret cookies for the cookie identified within the time-synchronization packet.

On the one hand, in the event that the cookie is found in the set of secret cookies, the second node may confirm that the time-synchronization packet is legitimate and/or originated from the first node. Upon confirming the legitimacy of the packet, the second node may remove the cookie identified in the packet from the set of secret cookies and then account for and/or use this time-synchronization packet in the corresponding time-synchronization calculation. On the other hand, in the event that the cookie is not found in the set of secret cookies, the second node may determine that the time-synchronization packet is illegitimate. As a result, the second node may disregard and/or refuse to account for and/or use this time-synchronization packet in the corresponding time-synchronization calculation. In doing so, the second node may protect against DoS attacks that involve disrupting the time synchronization between the first and second nodes.

Figure 2:
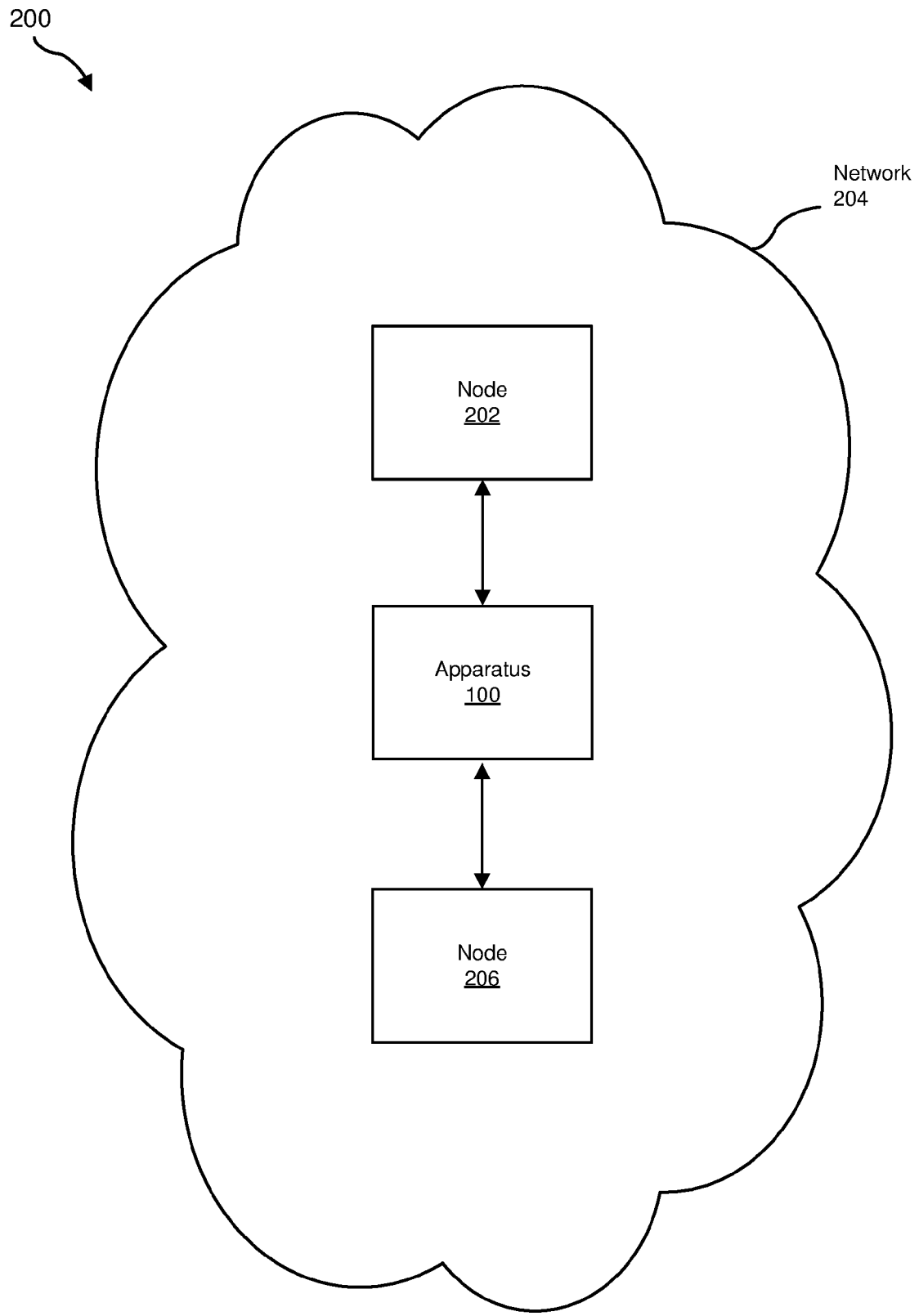
FIG. 2 is a block diagram of an exemplary implementation of an apparatus for protecting against DoS attacks.

The following will provide, with reference to FIGS. 1 and 2, examples of apparatuses and corresponding implementations for protecting against DoS attacks. The discussion corresponding to FIG. 3 will provide examples of cookies that facilitate authenticating packets received from a node within a network. The discussions corresponding to FIGS. 4-6 will provide examples of timing diagrams in connection with cookie transmissions. The discussion corresponding to FIG. 7 will provide examples of a method for protecting against DoS attacks. Finally, the discussion corresponding to FIG. 8 will provide numerous examples of systems that may include the components shown in FIG. 1.

FIG. 1 shows an exemplary apparatus 100 for protecting against DoS attacks. Examples of apparatus 100 include, without limitation, network devices, routers, switches, hubs, modems, bridges, repeaters, gateways, load balancers, multiplexers, network adapters, servers, client devices, portions of one or more of the same, variations or combinations of one or more of the same, and/or any other suitable apparatus.

As illustrated in FIG. 1, apparatus 100 may include a storage device 102 and a processing unit 106. Storage device 102 generally represents any type or form of volatile or non-volatile memory or storage medium capable of storing data and/or computer-readable instructions. In one example, storage device 102 may store, load, and/or maintain a set of cookies 104. Examples of storage device 102 include, without limitation, Random Access Memory (RAM), Read Only Memory (ROM), flash memory, Hard Disc Drives (HDDs), Solid-State Drives (SSD), optical disk drives, caches, variations or combinations of one or more of the same, and/or any other suitable storage device.

Cookies 104 each generally represent data that is used to authenticate, validate, and/or invalidate a packet transferred between nodes within a network. In one example, a cookie may represent data that facilitates authentication of a single packet transferred from one node to another. Accordingly, a cookie may be unable to authenticate multiple packets transferred from one node to another. After a single use, the cookie may be disposed, deleted, and/or removed from the set of secret cookies.

Processing unit 106 generally represents any type or form of hardware-implemented processor capable of interpreting and/or executing computer-readable instructions. In one example, processing unit 106 may access, add, remove, and/or modify cookies 104 stored in storage device 102. Examples of processing unit 106 include, without limitation, physical processors, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable processing unit.

Apparatus 100 in FIG. 1 may be implemented in a variety of ways and/or contexts. As a specific example, FIG. 2 shows a block diagram of an exemplary implementation 200 that includes apparatus 100 for protecting against DoS attacks. As illustrated in FIG. 2, implementation 200 may include a network 204 that consists of multiple computing devices. For example, network 204 may include and/or represent a node 202, a node 206, and/or apparatus 100. In this example, nodes 202 and 206 may be able to exchange communications with one another via apparatus 100. Network 204 may include other network devices (not necessarily illustrated in FIG. 2) that sit between nodes 202 and 206 and/or are included in the path that links node 202 with node 206.

Nodes 202 and 206 each generally represent any type or form of computing device capable of reading computer-executable instructions. In one example, nodes 202 and 206 may each include and/or represent a physical network device (such as a router, switch, and/or gateway). Additional examples of nodes 202 and 206 include, without limitation, client devices, computing devices, servers, laptops, tablets, desktops, storage devices, cellular phones, Personal Digital Assistants (PDAs), multimedia players, embedded systems, wearable devices (e.g., smart watches, smart glasses, etc.), gaming consoles, variations or combinations of one or more of the same, and/or any other suitable nodes.

Network 204 generally represents any medium or architecture capable of facilitating communication or data transfer. In one example, network 204 may facilitate communication between nodes 202 and 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network. Although not necessarily illustrated in this way in FIG. 2, network 204 may also include and/or represent various other computing devices in addition to nodes 202 and 206 and apparatus 100.

In some examples, processing unit 106 of apparatus 100 may receive at least one packet from node 202. For example, node 202 may initiate a time-synchronization operation with apparatus 100. As part of this time-synchronization operation, node 202 may send a series of NTP or PTP packets to apparatus 100 via network 204. As one of these packets arrives at apparatus 100, processing unit 106 may identify a cookie included in this packet.

In some examples, processing unit 106 may search cookies 104 stored in storage device 102 for the same cookie that was identified in the packet received from node 202. During this search of cookies 104, processing unit 106 may identify the cookie that was identified in the packet. Since, in this example, the same cookie is found in cookies 104, processing unit 106 may validate the packet by confirming that the packet is legitimate and/or originated from node 202. As a result, processing unit 106 may incorporate this packet into the corresponding time-synchronization calculation and/or account for this packet in the corresponding time-synchronization calculation.

In some examples, in response to identifying the same cookie in cookies 104 and thus validating the packet, processing unit 106 may removes that cookie from cookies 104. By removing that cookie in this way, processing unit 106 may ensure that the same cookie is no longer valid for any future packets received from the node. In other words, in the event that a subsequent packet with the same cookie arrives at apparatus 100, processing unit 106 may disregard the subsequent packet and/or refuse to validate the subsequent packet because that cookie has been removed from cookies 104.

In one example, as another packet arrives at apparatus 100, processing unit 106 may identify a cookie included in this other packet. Processing unit 106 may then search cookies 104 stored in storage device 102 for the same cookie that was identified in this other packet. During this search of cookies 104, processing unit 106 may fail to identify the cookie that was identified in the other packet because that cookie is not included in cookies 104. Since, in this example, that cookie is not found in cookies 104, processing unit 106 may invalidate the packet and thus determine that the time-synchronization packet is illegitimate and/or originated from a different node (not necessarily illustrated in FIG. 2) that is masquerading as node 202. As a result, processing unit 106 may disregard and/or refuse to account for this other packet in the corresponding time-synchronization calculation.

In other words, processing unit 106 may authenticate the legitimacy of certain packets based at least in part on the cookies included in such packets being identified in cookies 104 stored in the storage device. In response to such authentication, processing unit 106 may account for the authenticated packets in the corresponding time-synchronization calculation. However, in response to invalidating certain packets, processing unit 106 may perform a security action in connection with such packets. For example, processing unit 106 may disregard the invalidated packets. In one example, processing unit 106 may report the invalidated packets to a security device and/or a security application. Additionally or alternatively, processing unit 106 may attempt to identify and/or blacklist the device masquerading as node 202. By accounting for the authenticated packets and/or disregarding the unauthenticated packets in this way, processing unit 106 may protect against DoS attacks that involve disrupting the time synchronization between node 202 and apparatus 100.

In some examples, processing unit 106 may receive at least one communication from node 202. This communication may include set of cookies 104. In such examples, processing unit 106 may identify set of cookies 104 within this communication. Processing unit 106 may populate storage device 102 with set of cookies 104. For example, processing unit 106 may add cookies 104 to any existing cookies already stored in storage device 102. Additionally or alternatively, processing unit 106 may replace any or all existing cookies already stored in storage device 102 with cookies 104.

In some examples, the communication may be encrypted. For example, node 202 may encrypt the communication using a private key. Node 202 may store this private key in a Trusted Platform Module (TPM) for security purposes. In this example, node 202 may send the encrypted communication to apparatus 100. As the encrypted communication reaches apparatus 100, processing unit 106 may decrypt the communication using the private key's corresponding public key. Processing unit 106 may store this public key in a TPM for security purposes.

FIG. 3 shows an exemplary set of cookies 104. As shown in FIG. 3, cookies 104 may include and/or represent a list of hexadecimal representations (in this example, "0x3AF7," "0xBC19," "0x42ED," "0x64A2," "0x140A," "0x4820," "0x47BD," and "0x592F").

In some examples, node 202 and apparatus 100 may perform the exchange of cookies 104 in a variety of ways. For example, node 202 may send an out-of-band communication to apparatus 100 in connection with a setup operation. The term "out-of-band," as used herein, generally refers to a communication scheme in which a configuration or control transmission is initiated independent of the main data stream (sometimes referred to as the in-band data stream). This out-of-band communication may include and/or represent a list of cookies 104 sent independent of the main data stream. In this example, the setup operation may facilitate coordinating node 202 and apparatus 100 with respect to cookies 104.

In this out-of-band approach, node 202 may determine that the number of valid cookies remaining within set of cookies 104 stored in storage device 102 is below a certain threshold. For example, node 202 may know which cookies have been spent and which cookies remain because node 202 is responsible for sending the legitimate packets that include those cookies to apparatus 100. In response to determining that the number of valid cookies remaining within set of cookies 104 is below the threshold, processing unit 106 may send a subsequent out-of-band communication to apparatus 100 in connection with another setup operation. This subsequent out-of-band communication may include and/or represent another list of cookies. Upon receiving this other list of cookies, processing unit 106 may populate storage device 102 with this other list of cookies to update the set.

Figure 4:
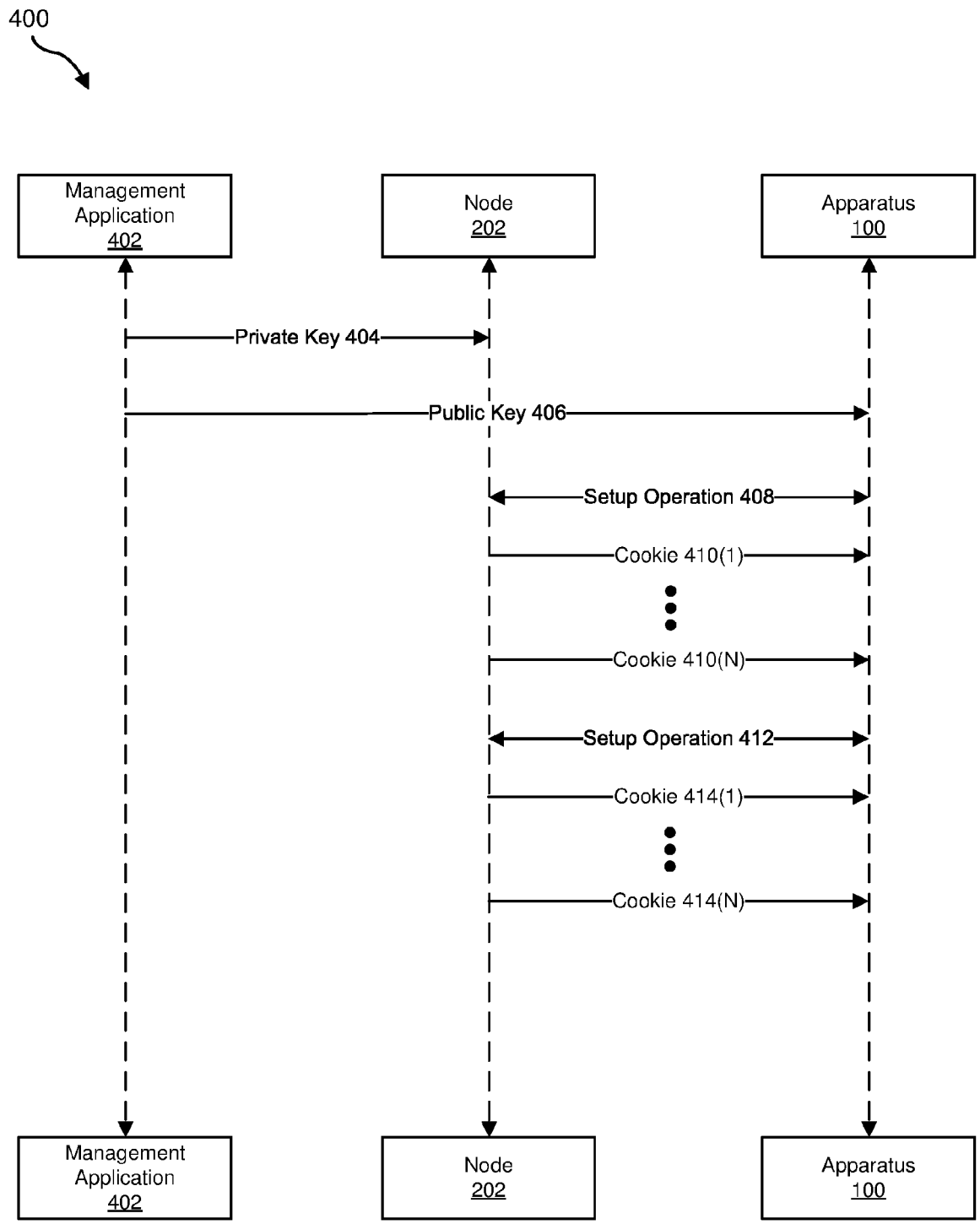
FIG. 4 is a timing diagram of an exemplary out-of-band operation that facilitates coordinating a node and an apparatus with respect to a set of cookies.

FIG. 4 shows an exemplary timing diagram 400 that represents an out-of-band approach to the exchange and/or coordination of cookies between node 202 and apparatus 100. As shown in FIG. 4, a management application 402 may distribute a private key 404 to node 202 and a public key 406 to apparatus 100. Node 202 and apparatus 100 may then perform a setup operation 408 with respect to one another. As part of this setup operation, node 202 may encrypt cookies 410(1)-(N) with private key 404 and then send these encrypted cookies to apparatus 100.

Continuing with this example, apparatus 100 may receive the encrypted cookies and then decrypt the encrypted cookies with public key 406. Once the number of valid cookies dips below a certain threshold, node 202 and apparatus 100 may perform a subsequent setup operation 412 with respect to one another to replenish the cookie supply. As part of this subsequent setup operation, node 202 may encrypt cookies 414 (1)-(N) using private key 404 and then send these encrypted cookies to apparatus 100.

In another example, node 202 may send an in-band communication to apparatus 100 during a clock-synchronization operation. The term "in-band," as used herein, generally refers to a communication scheme in which a configuration or control transmission is initiated on the same connection as the main data stream. This in-band communication may include and/or represent a list of cookies 104 sent on the same connection as the main data stream. Additionally or alternatively, this in-band communication may include and/or represent a packet that is formatted in the same clock-synchronization protocol (e.g., NTP or PTP) as the main data stream.

Figure 5:
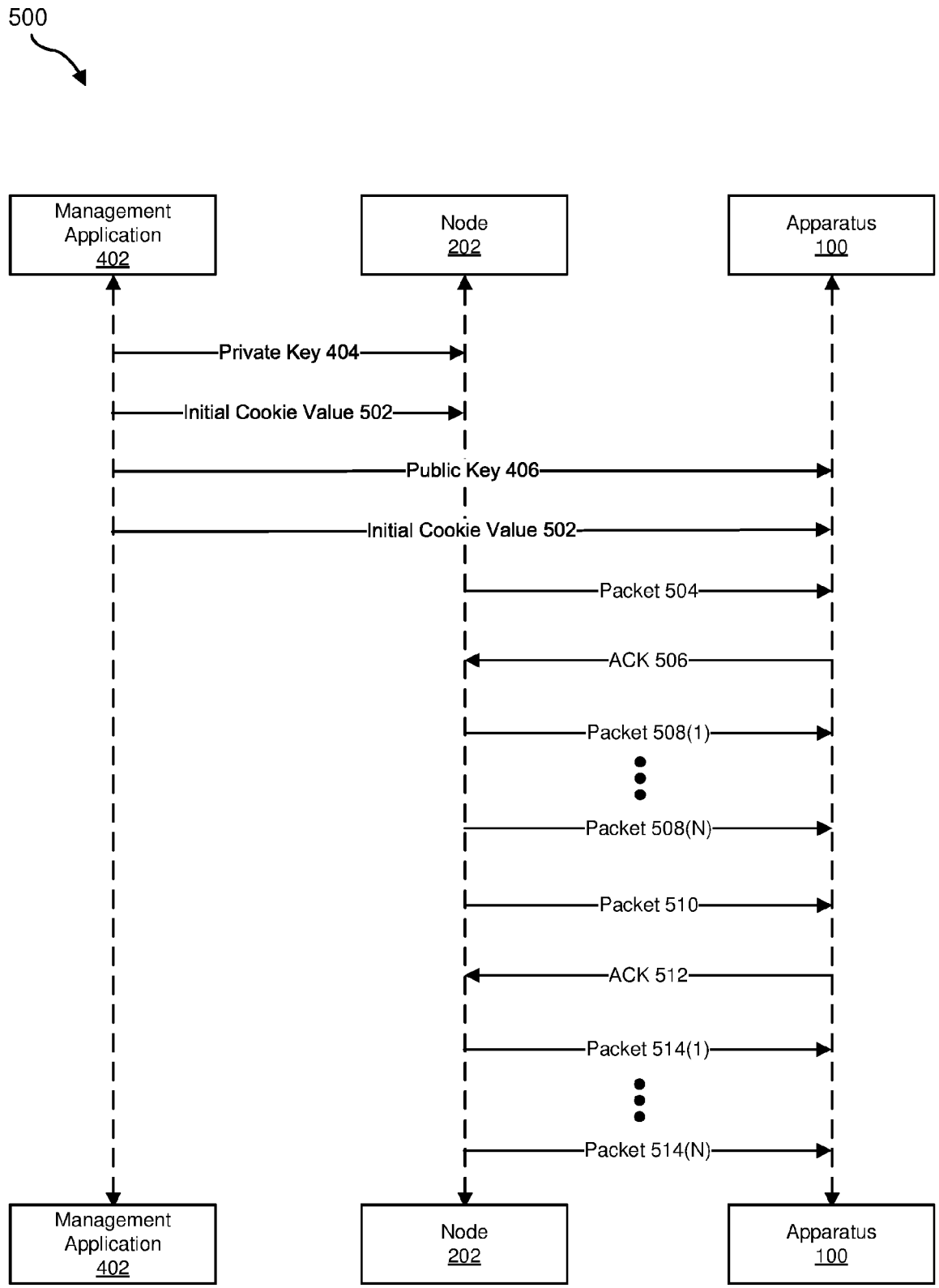
FIG. 5 is a timing diagram of an exemplary in-band operation that facilitates coordinating a node and an apparatus with respect to a set of cookies.

FIG. 5 shows an exemplary timing diagram 500 that represents an in-band approach to the exchange and/or coordination of cookies between node 202 and apparatus 100. As shown in FIG. 5, management application 402 may distribute private key 404 and an initial cookie value 502 to node 202 and public key 406 and initial cookie value 502 to apparatus 100. Node 202 may generate a packet 504 that includes a first set of secret cookies for use in authenticating subsequent packets exchanged between node 202 and apparatus 100. Packet 504 may also include initial cookie value 502 as the packet's cookie. Node 202 may encrypt packet 504 using private key 404 and then send this packet to apparatus 100.

Continuing with this example, apparatus 100 may receive packet 504 and then decrypt the same with public key 406. Apparatus 100 may also authenticate the legitimacy of packet 504 by confirming that the packet's cookie matches initial cookie value 502. Apparatus 100 may configure itself to allow, authenticate, and/or account for subsequent packets whose cookies belong to the first set of secret cookies included in packet 504.

In response to receiving and authenticating packet 504, apparatus 100 may send an ACKnowledge (ACK) 506 to node 202. Once node 202 receives ACK 506, node 202 may proceed by sending packets 508(1)-(N). In this example, packet 504 may be formatted in the same clock-synchronization protocol (e.g., NTP or PTP) as the main data stream (e.g., packets 508(1)-(N)).

Once the number of valid cookies dips below a certain threshold, node 202 may encrypt a packet 510 that includes a subsequent set of secret cookies using private key 404. Packet 510 may also include a cookie value that was picked from the first set of secret cookies to facilitate authentication. Node 202 may then send this packet to apparatus 100 to replenish the cookie supply. Apparatus 100 may receive this packet and then decrypt the same with public key 406. Apparatus 100 may also authenticate the legitimacy of packet 510 by confirming that the packet's cookie matches one of the secret cookies from the first set. In response to receiving and authenticating packet 510, apparatus 100 may send an ACK 512 to node 202. Once node 202 receives ACK 512, node 202 may proceed by sending packets 514(1)-(N). In this example, packet 510 may be formatted in the same clock-synchronization protocol (e.g., NTP or PTP) as the main data stream (e.g., packets 514(1)-(N)).

Figure 6:
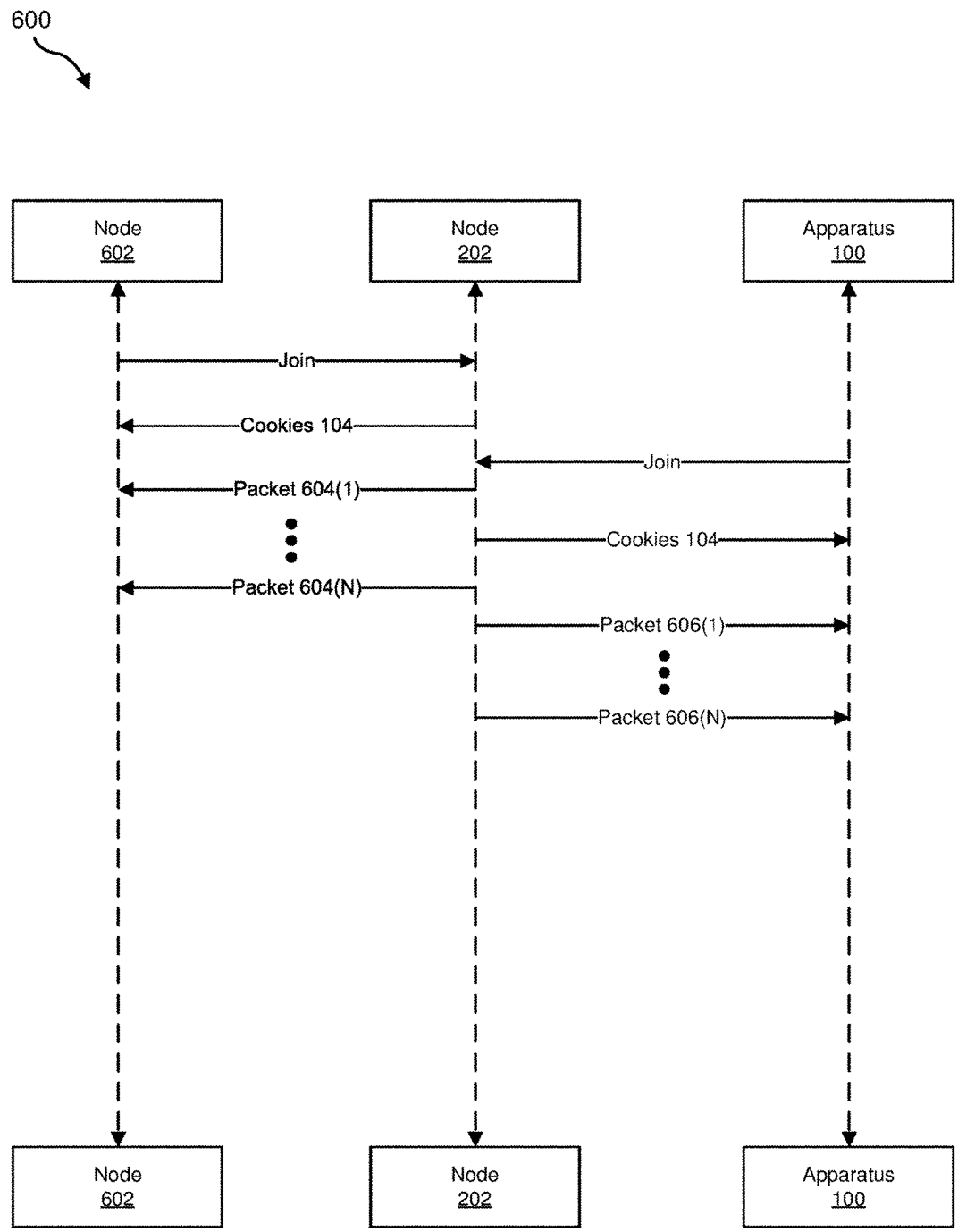
FIG. 6 is a timing diagram of an exemplary configuration operation that facilitates coordinating one sender and multiple receivers with respect to a set of cookies.

FIG. 6 shows an exemplary timing diagram 600 that represents a one-to-many approach to the exchange and/or coordination of cookies between a node 602, node 202, and apparatus 100. As shown in FIG. 6, node 602 may join node 202. After this joining, node 202 may send cookies 104 to node 602. Node 202 may then send packets 604(1)-(N) as the main data stream to node 602. Similarly, apparatus 100 may join node 202. After this joining, node 202 may send cookies 104 to apparatus 100. Node 202 may then send packets 606(1)-(N) as the main data stream to apparatus 100.

In some examples, node 202 and/or apparatus 100 may implement different levels of security with respect to their communications. However, as the level of security increases, the efficiency of their communication scheme may decrease. For example, a lower level of security may involve simply ensuring that packets received from node 202 include valid cookies. In this example, a higher level of security may involve ensuring that packets received from node 202 each include a valid cookie at a fixed offset.

As a specific example, the communication that includes the set of secret cookies may also identify a specific offset where each cookie is located within packets received from node 202. For example, node 202 may select a certain offset for placing the cookies within the packets sent to apparatus 100. Node 202 may configure the communication that includes the set of secret cookies with an offset representation that identifies the selected offset. Node 202 may then send the communication to apparatus 100 to establish the fixed offset with respect to one another. Upon receiving the communication, apparatus 100 may be able to identify the cookies included in subsequent packets at the offset selected by node 202.

In this example, the packets may be formatted in a clock-synchronization protocol (such as NTP or PTP) and have certain enhanced features. For example, the packets may each include a new field for the secret cookie in the header. This field may be located at the fixed offset from the beginning of the header.

In one example, node 202 and/or apparatus 100 may implement one or more aging counters in connection with the set of secret cookies. For example, one of the cookies may have an aging counter that indicates whether the cookie has expired and/or become stale. In this example, node 202 and/or apparatus 100 may determine that the aging counter exceeds a certain threshold, thus indicating that the cookie has expired and/or become stale. In response, node 202 and/or apparatus 100 may delete and/or remove the expired and/or stale cookie from the set of cookies such that the cookie is no longer valid for any future packets sent by node 202 and/or received by apparatus 100.

In some examples, apparatus 100 may configure, apply, and/or implement a packet processing rule as instructed by node 202. In one example, node 202 may send instructions for configuring, applying, and/or implementing this packet processing rule to apparatus 100 (in, e.g., the communication that includes the set of secret cookies). In this example, apparatus 100 may enforce this packet processing rule via hardware (e.g., a hardware filter). This packet processing rule may control which packets are accounted for and/or used in the corresponding time-synchronization calculation.

Figure 7:
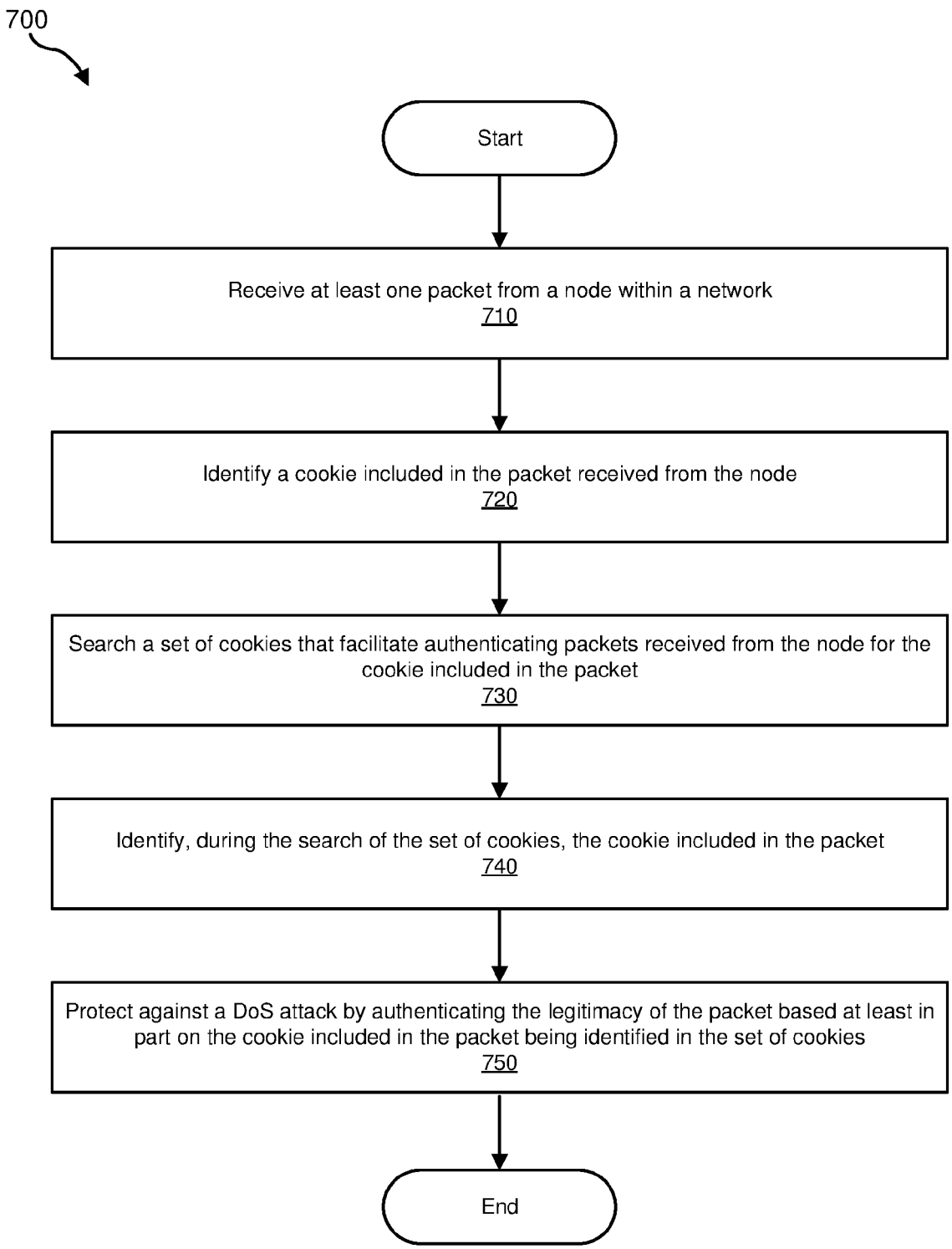
FIG. 7 is a flow diagram of an exemplary method for protecting against DoS attacks.

FIG. 7 is a flow diagram of an exemplary method 700 for protecting against DoS attacks. Method 700 may include the step of receiving a packet from a node within a network (710). This receiving step may be performed in a variety of ways. In one example, processing unit 106 of apparatus 100 may detect and/or receive a packet from node 202 within network 204. In another example, processing unit 106 may detect and/or receive a packet from another node (e.g., node 206) that is masquerading as node 202.

In some examples, method 700 may also include the step of identifying a cookie included in the packet received from the node (720). This identifying step may be performed in a variety of ways. In one example, processing unit 106 of apparatus 100 may search for a cookie at a fixed offset within the header of the packet. During this search, processing unit 106 may identify a cookie at that fixed offset within the packet's header.

In some examples, method 700 may further include the step of searching a set of cookies that facilitate authenticating packets received from the node for the cookie included in the packet (730). This searching step may be performed in a variety of ways. In one example, processing unit 106 may search a set of cookies stored on apparatus 100 for the same cookie that was included in the packet. In this example, processing unit 106 may iterate through the set of cookies and compare the cookie included in the packet with each cookie within the set.

Additionally or alternatively, method 700 may include the step of identifying, during the search of the set of cookies, the cookie included in the packet (740). This identifying step may be performed in a variety of ways. In one example, during the search, processing unit 106 may identify the same cookie included in the packet within the set of cookies. In other words, processing unit 106 may find a cookie within the set that is identical to the one identified in the packet. Upon finding this cookie in the set, processing unit 106 may cease its search of the set.

Finally, method 700 may include the step of protecting against a DoS attack by authenticating the packet based at least in part on the cookie included in the packet being identified in the set of cookies (750). This protecting step may be performed in a variety of ways. In one example, processing unit 106 may authenticate the packet as having legitimately originated from node 202. In response, processing unit 106 may account for and/or use the values corresponding to this packet in a time-synchronization calculation between node 202 and apparatus 100. In doing so, processing unit 106 may protect a DoS attack by ensuring that the packet did not originate from a malicious node masquerading as node 202.

Figure 8:
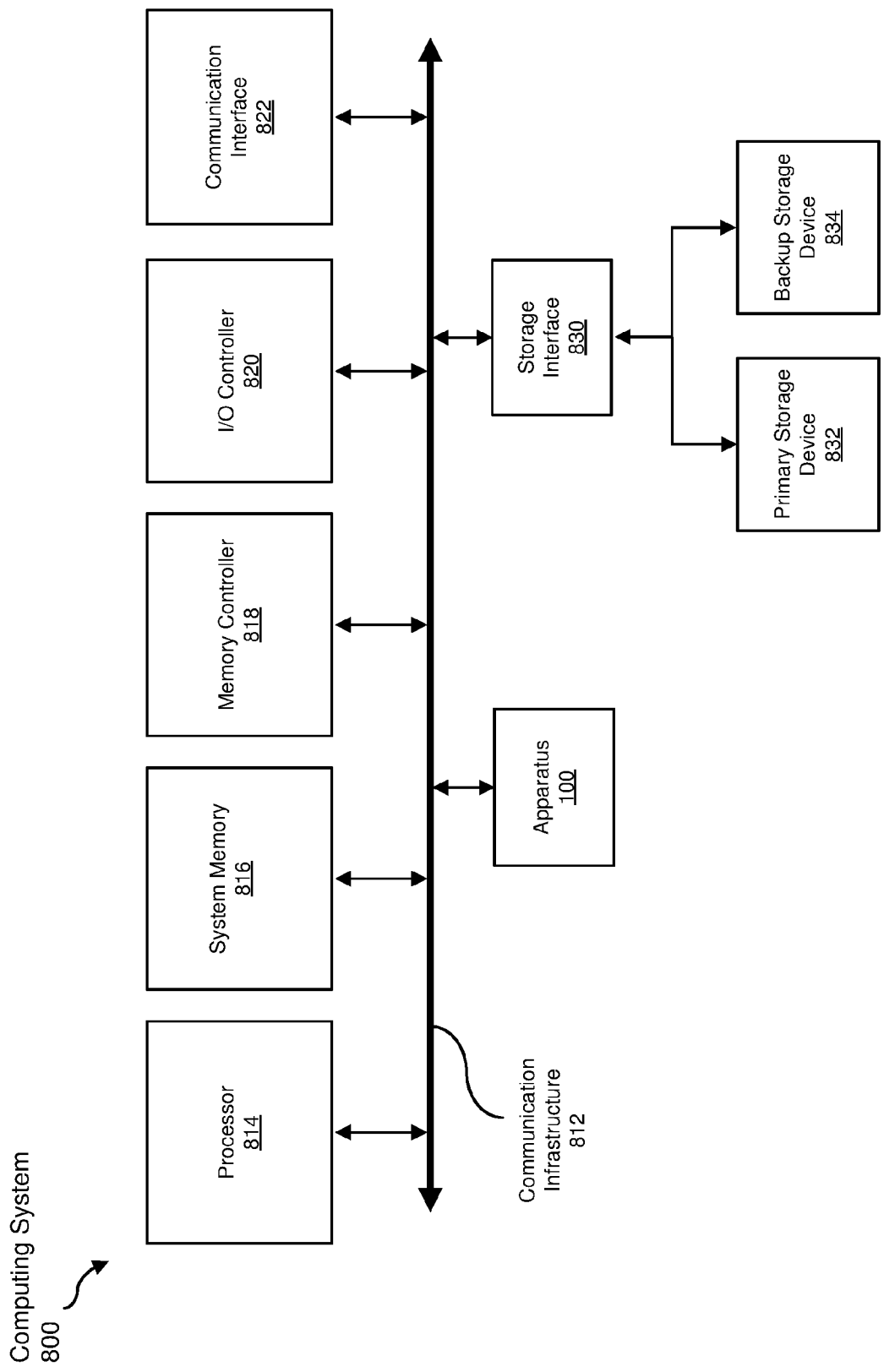
FIG. 8 is a block diagram of an exemplary computing system capable of implementing and/or being used in connection with one or more of the embodiments described and/or illustrated herein.

FIG. 8 is a block diagram of an exemplary computing system 800 capable of implementing and/or being used in connection with one or more of the embodiments described and/or illustrated herein. In some embodiments, all or a portion of computing system 800 may perform and/or be a means for performing, either alone or in combination with other elements, one or more of the steps described in connection with FIG. 7. All or a portion of computing system 800 may also perform and/or be a means for performing and/or implementing any other steps, methods, or processes described and/or illustrated herein. In one example, computing system 800 may include apparatus 100 from FIG. 1.

Computing system 800 broadly represents any type or form of electrical load, including a single or multi-processor computing device or system capable of executing computer-readable instructions. Examples of computing system 800 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 800 may be programmed, configured, and/or otherwise designed to comply with one or more networking protocols. According to certain embodiments, computing system 800 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 800 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 800 may include various network and/or computing components. For example, computing system 800 may include at least one processor 814 and a system memory 816. Processor 814 generally represents any type or form of processing unit capable of processing data or interpreting and executing instructions. For example, processor 814 may represent an application-specific integrated circuit (ASIC), a system on a chip (e.g., a network processor), a hardware accelerator, a general purpose processor, and/or any other suitable processing element.

Processor 814 may process data according to one or more of the networking protocols discussed above. For example, processor 814 may execute or implement a portion of a protocol stack, may process packets, may perform memory operations (e.g., queuing packets for later processing), may execute end-user applications, and/or may perform any other processing tasks.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 800 may include both a volatile memory unit (such as, for example, system memory 816) and a non-volatile storage device (such as, for example, primary storage device 832, as described in detail below). System memory 816 may be implemented as shared memory and/or distributed memory in a network device. Furthermore, system memory 816 may store packets and/or other information used in networking operations.

In certain embodiments, exemplary computing system 800 may also include one or more components or elements in addition to processor 814 and system memory 816. For example, as illustrated in FIG. 8, computing system 800 may include a memory controller 818, an Input/Output (I/O) controller 820, and a communication interface 822, each of which may be interconnected via communication infrastructure 812. Communication infrastructure 812 generally represents any type or form of infrastructure capable of facilitating communication between one or more components of a computing device. Examples of communication infrastructure 812 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 818 generally represents any type or form of device capable of handling memory or data or controlling communication between one or more components of computing system 800. For example, in certain embodiments memory controller 818 may control communication between processor 814, system memory 816, and I/O controller 820 via communication infrastructure 812. In some embodiments, memory controller 818 may include a Direct Memory Access (DMA) unit that may transfer data (e.g., packets) to or from a link adapter.

I/O controller 820 generally represents any type or form of device or module capable of coordinating and/or controlling the input and output functions of a computing device. For example, in certain embodiments I/O controller 820 may control or facilitate transfer of data between one or more elements of computing system 800, such as processor 814, system memory 816, communication interface 822, and storage interface 830.

Communication interface 822 broadly represents any type or form of communication device or adapter capable of facilitating communication between exemplary computing system 800 and one or more additional devices. For example, in certain embodiments communication interface 822 may facilitate communication between computing system 800 and a private or public network including additional computing systems. Examples of communication interface 822 include, without limitation, a link adapter, a wired network interface (such as a network interface card), a wireless network interface (such as a wireless network interface card), and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 822 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also enable computing system 800 to engage in distributed or remote computing. For example, communication interface 822 may receive instructions from a remote device or send instructions to a remote device for execution.

As illustrated in FIG. 8, exemplary computing system 800 may also include a primary storage device 832 and/or a backup storage device 834 coupled to communication infrastructure 812 via a storage interface 830. Storage devices 832 and 834 generally represent any type or form of storage device or medium capable of storing data and/or other computer-readable instructions. For example, storage devices 832 and 834 may represent a magnetic disk drive (e.g., a so-called hard drive), a solid state drive, a floppy disk drive, a magnetic tape drive, an optical disk drive, a flash drive, or the like. Storage interface 830 generally represents any type or form of interface or device for transferring data between storage devices 832 and 834 and other components of computing system 800.

In certain embodiments, storage devices 832 and 834 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 834 may also include other similar structures or devices for allowing computer software, data, or other computer-readable instructions to be loaded into computing system 800. For example, storage devices 832 and 834 may be configured to read and write software, data, or other computer-readable information. Storage devices 832 and 834 may be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from those shown in FIG. 8. Computing system 800 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or another remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
   a storage device that stores a set of cookies that facilitate authenticating packets received from a node within a network; and
   a processing unit communicatively coupled to the storage device, wherein the processing unit:
   receives, from the node within the network, at least one time-synchronization packet that is formatted in a time-synchronization protocol as part of a time-synchronization operation;
   identifies a cookie included in the time-synchronization packet received from the node;
   searches the set of cookies stored in the storage device for the cookie included in the time-synchronization packet received from the node;
   identifies, within the set of cookies stored in the storage device, the cookie included in the time-synchronization packet received from the node;
   protects against a Denial of Service (DoS) attack by authenticating the legitimacy of the time-synchronization packet by:
   confirming that the cookie included in the time-synchronization packet is identified in the set of cookies stored in the storage device; and
   ensuring that the time-synchronization packet did not originate from a malicious node masquerading as a trusted peer; and
   synchronizes the apparatus with the node based at least in part on a time-synchronization calculation that accounts for the time-synchronization packet.

2. The apparatus of claim 1, wherein the processing unit removes, in response to identifying the cookie included in the packet, the cookie from the set of cookies such that the cookie is no longer valid for any future packets received from the node.

3. The apparatus of claim 1, wherein the processing unit:
   receives at least one communication from the node within the network;
   identifies the set of cookies within the communication received from the node; and
   populates the storage device with the set of cookies identified within the communication received from the node.

4. The apparatus of claim 3, wherein the communication comprises at least one out-of-band list that:
   includes the set of cookies; and
   is sent by the node during a setup operation that facilitates coordinating the node and the apparatus with respect to the set of cookies.

5. The apparatus of claim 4, wherein the processing unit:
   receives, from the node within the network, at least one subsequent communication that:
   comprises another out-of-band list that includes another set of cookies; and
   is sent by the node in response to determining that the number of valid cookies remaining within the set of cookies is below a certain threshold; and
   populates the storage device with the other set of cookies included in the other out-of-band list of the subsequent communication.

6. The apparatus of claim 4, wherein:
   the communication comprises an offset representation that identifies an offset where each cookie is located within packets received from the node; and
   the processing unit identifies the cookie included in the packet at the offset identified by the offset representation.

7. The apparatus of claim 3, wherein:
   the communication is encrypted by the node using a private key;
   the processing unit:
   receives, from a management application, a public key that facilitates decrypting communications that have been encrypted by the node using the private key; and
   decrypts the communication using the public key received from the management application.

8. The apparatus of claim 3, wherein the communication comprises a previous packet that:
   is formatted in the clock-synchronization protocol; and
   incorporates at least one in-band list that:
   includes the set of cookies; and
   is sent by the node during a clock-synchronization operation.

9. The apparatus of claim 8, wherein the processing unit:
   receives, from the node within the network, at least one subsequent communication that comprises another packet that:
   is formatted in the clock-synchronization protocol; and
   incorporates at least one in-band list that:
   includes another set of cookies; and
   is sent by the node during another clock-synchronization operation.

10. The apparatus of claim 1, wherein the processing unit:
    identifies at least one aging counter in connection with at least one other cookie within the set of cookies;

determines that the aging counter exceeds a certain threshold; and removes, in response to determining that the aging counter exceeds the certain threshold, the other cookie from the set of cookies such that the cookie is no longer valid for any future packets received from the node.

11. A router comprising:

a storage device that stores a set of cookies that facilitate authenticating packets received from a node within a network; and a processing unit communicatively coupled to the storage device, wherein the processing unit:

receives, from the node within the network, at least one time-synchronization packet that is formatted in a time-synchronization protocol as part of a time-synchronization operation;

identifies a cookie included in the time-synchronization packet received from the node;

searches the set of cookies stored in the storage device for the cookie included in the time-synchronization packet received from the node;

identifies, within the set of cookies stored in the storage device, the cookie included in the time-synchronization packet received from the node;

protects against a Denial of Service (DoS) attack by authenticating the legitimacy of the time-synchronization packet by:

confirming that the cookie included in the time-synchronization packet is identified in the set of cookies stored in the storage device; and ensuring that the time-synchronization packet did not originate from a malicious node masquerading as a trusted peer; and synchronizes the router with the node based at least in part on a time-synchronization calculation that accounts for the time-synchronization packet.

12. The router of claim 11, wherein the processing unit removes, in response to identifying the cookie included in the packet, the cookie from the set of cookies such that the cookie is no longer valid for any future packets received from the node.

13. The router of claim 11, wherein the processing unit:

receives at least one communication from the node within the network;

identifies the set of cookies within the communication received from the node; and populates the storage device with the set of cookies identified within the communication received from the node.

14. The router of claim 13, wherein the communication comprises at least one out-of-band list that:

includes the set of cookies; and is sent by the node during a setup operation that facilitates coordinating the node and the router with respect to the set of cookies.

15. The router of claim 14, wherein the processing unit:

receives, from the node within the network, at least one subsequent communication that:

comprises another out-of-band list that includes another set of cookies; and is sent by the node in response to determining that the number of valid cookies remaining within the set of cookies is below a certain threshold; and populates the storage device with the other set of cookies included in the other out-of-band list of the subsequent communication.

16. The router of claim 14, wherein:

the communication comprises an offset representation that identifies an offset where each cookie is located within packets received from the node; and the processing unit identifies the cookie included in the packet at the offset identified by the offset representation.

17. The router of claim 13, wherein:

the communication is encrypted by the node using a private key;

the processing unit:

receives, from a management application, a public key that facilitates decrypting communications that have been encrypted by the node using the private key; and decrypts the communication using the public key received from the management application.

18. The router of claim 13, wherein the communication comprises a previous packet that:

is formatted in the clock-synchronization protocol; and incorporates at least one in-band list that:

includes the set of cookies; and is sent by the node during a clock-synchronization operation.

19. The router of claim 18, wherein the processing unit:

receives, from the node within the network, at least one subsequent communication that comprises another packet that:

is formatted in the clock-synchronization protocol; and incorporates at least one in-band list that:

includes another set of cookies; and is sent by the node during another clock-synchronization operation.

20. A method comprising:

receiving, at a first node, at least one packet that:

originates from a second node; and is formatted in a time-synchronization protocol as part of a time-synchronization operation;

identifying, at the first node, a cookie included in the time-synchronization packet received from the second node;

searching, at the first node, a set of cookies that facilitate authenticating packets received from the second node for the cookie included in the time-synchronization packet;

identifying, within the set of cookies that facilitate authenticating packets received from the second node, the cookie included in the time-synchronization packet; and protecting against a Denial of Service (DoS) attack by authenticating the legitimacy of the time-synchronization packet by:

confirming that the cookie included in the time-synchronization packet is identified in the set of cookies that facilitate authenticating packets received from the second node; and ensuring that the time-synchronization packet did not originate from a malicious node masquerading as a trusted peer; and synchronizing the first node with the second node based at least in part on a time-synchronization calculation that accounts for the time-synchronization packet.

* * * * *